I. W. Dawson,
Stretching Leather.
No. 2,790. Reissued Oct. 29, 1867
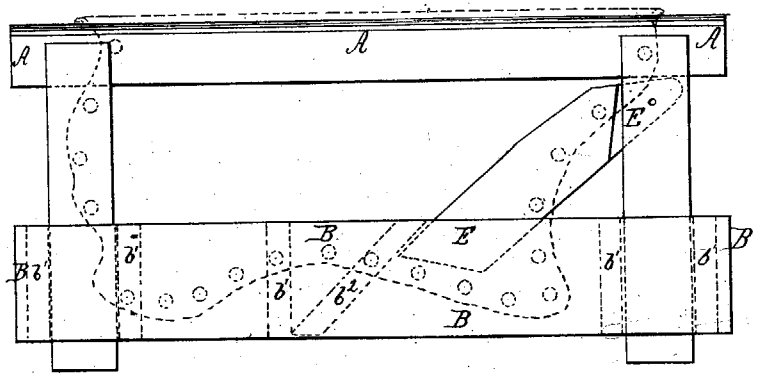
Witnesses:
Wm Irwin
F. Blockley
Inventor:
I. W. Dawson
Per Munn & Co
Attorneys
N. PETERS, PHOTO-LITHOGRAPHER, WASHINGTON, D. C.

United States Patent Office.

ICHABOD W. DAWSON, OF NEWARK, NEW JERSEY.

*Letters Patent No.* 66,131, *dated June* 25, 1867; *reissue No.* 2,790, *dated October* 29, 1867.

DIVISION A.

IMPROVED MECHANISM FOR STRETCHING LEATHER.

The Schedule referred to in these Letters Patent and making part of the same.

TO ALL WHOM IT MAY CONCERN:

Be it known that I, ICHABOD W. DAWSON, of Newark, in the county of Essex, and State of New Jersey, have invented a new and useful Mechanism for Stretching Hides and Leather; and I do hereby declare that the following is a full, clear, and exact description thereof, which will enable others skilled in the art to make and use the same, reference being had to the accompanying drawings, forming part of this specification.

The figure is a side view of my improved stretching mechanism, showing in red lines a hide extended thereon.

My invention has for its object to furnish an improved frame, so constructed that the hides, after being extended upon the frame, and supported centrally, may be stretched in all directions, so as to bring out all the wrinkles and folds in the same, leaving the surface of the leather smooth and better prepared for the subsequent operations.

The invention consists in a frame for stretching hides or leather breadthwise, composed of a bar or bars, to which the hide's side edges are secured, and a movable bar bearing against the centre of the hide, the said bars being governed as to their movements from or toward each other by a screw, or any equivalent or suitable mechanism; also in mechanism in combination with the above for stretching the hide lengthwise.

A is the bar of the frame, for supporting the middle of the hides. B is a second bar or bars, parallel to A, and to which, on its opposite sides, the hide's side edges are suitably secured, either by tacks or otherwise. C D are arms attached to one of the bars, the other ends of the same working in suitable grooves or slots in the other bar. These arms are for the purpose of guiding and insuring the proper action of the bars A B. E is an arm, pivoted to the arm C near the bar A. The end of the bar E hangs down, and enters a groove or opening in or between bar or bars B. The side $b^2$ of the opening in which the arm E enters is inclined from a vertical position, as shown, and when the bars A B are moved apart the end of arm E, coming against the inclined side $b^2$, will be moved gradually from its central position towards the arm to which it is pivoted, and in this manner stretch the hide which is suitably secured to that arm lengthwise.

When it is desired to stretch and dry a hide, it is first laid evenly over the bar A, the hide's side edges are brought to opposite sides of the bar or bars B, and there secured, the neck being also secured to arm E. Then, by means of one or more jack-screws, or any equivalent or suitable mechanism, the bars are gradually forced apart, the arm E, by the same movement, being thrown to the side, thus gradually and evenly stretching the hide in the direction of its length and breadth.

Having thus described my invention, what I claim, and desire to secure by Letters Patent, is—

1. The combination of means for supporting the centre of the hide, with means for stretching the same breadthwise over the said support, substantially as described.

2. The combination of means for supporting the centre of the hide, with means for stretching the same breadthwise and lengthwise over the said support, substantially as described.

ICHABOD W. DAWSON.

Witnesses:

JACOB H. DAWSON, Jr.,

JNO. R. ELLIOTT.